Sept. 30, 1952  E. F. SHELLEY  2,612,039
STRESS MEASUREMENT TECHNIQUE
Filed April 10, 1946  3 Sheets-Sheet 1

INVENTOR.
Edwin F. Shelley
BY
ATTORNEY

INVENTOR.
Edwin F. Shelley
BY
Godfrey B. Spein
ATTORNEY

INVENTOR.
Edwin F. Shelley
BY
ATTORNEY

Patented Sept. 30, 1952

2,612,039

UNITED STATES PATENT OFFICE 2,612,039

STRESS MEASUREMENT TECHNIQUE

Edwin F. Shelley, New York, N. Y., assignor to Curtiss-Wright Corporation, a corporation of Delaware Application April 10, 1946, Serial No. 660,906

12 Claims. (Cl. 73—88.5)

This invention relates to electrical measuring and recording apparatus and is particularly concerned with improvements in the measurement and recording of stresses in bodies by the use of electrical resistance stress gages.

In the aircraft art and in other arts, electrical resistance stress gages are commonly used to determine steady stresses under static test conditions, and vibratory stresses in structural parts while the article being tested is in operation. The stress gage, of which a plurality are usually used in conducting stress testing, consists of a fine resistance wire resistance element bonded to a portion of the article, the gage changing in resistance with stress in the article. For vibration stress testing, the gage is usually connected into a D. C. bridge circuit of the Wheatstone type and the bridge output potential is impressed upon an A. C. amplifier whose output is transmitted to an appropriate recording oscillograph. The visible trace of the vibration stress wave form is plotted against time and frequency and amplitude of stress are deduced therefrom. Where a considerable number of gages are used in a single test, each gage is connected into its own bridge, an amplifier serves each bridge, and the amplifier output is transmitted to an oscillograph which records a plurality of traces, from the several gages, on a single record.

While the gages mentioned are primarily responsive to strain in the article being tested they are so arranged, geometrically, that they respond to stress changes, and the oscillograph record secured from their use is interpreted in terms of stress in the article. Accordingly, the term "stress" will be used throughout the following description and will be construed as including "strain" since stress and strain bear a known relation to one another. For a description of stress gages reference may be made to S. B. Williams application, Serial No. 532,010, filed April 19, 1944.

The amplifying circuits used with stress gages are normally responsive to alternating current and ignore indications of steady or slowly changing stress conditions. Thus, present instrumentation serves admirably for recording vibrating stress but is lacking in its ability to record steady or slowly changing stress conditions. If the instrumentation can be arranged to insert on the oscillograph record either a zero stress datum or a known stress datum, the improved type of record will yield values of steady stress as well as vibrative stress imposed on the article.

The position of the zero-total-stress axis corresponds to zero voltage output of the stress-gage bridge, assuming an initial balance under no-stress conditions. If the bridge output is periodically reduced to zero for brief intervals of time, a rectangular pulse will be periodically inserted into the vibratory wave passed by the amplifier. The closed end of each pulse will correspond to the instantaneous position of zero total stress on the oscillograph record. The amplitude of the steady-stress component is thus indicated. This periodic reduction of the stress signal to zero may be effected by periodically short-circuiting the output of the stress-gage bridge. The pulse so generated will, if properly proportioned, be amplified and recorded with good fidelity by the ordinary vibratory-stress measuring equipment. Thus with the aid of a multi-circuit shorting switch, cyclically operated, the insertion method may easily be applied to standard multi-channel recording equipment.

It is an object of this invention to provide for the insertion of datum stress levels in a stress measuring system from which steady stress as well as vibrative stress can be evaluated. It is a further object of the invention to provide means for inserting datum indications in a record of transient or recurring phenomena whereby the magnitude of the phenomena can be evaluated. It is a further object of the invention to provide for the insertion of datum indications in a record of steady phenomena so that the magnitude of said phenomena may be evaluated. Still another object of the invention is to provide a datum inserting system in known electrical recording apparatus without encroaching to any material extent on the form and structure of existing apparatus and without encroaching on the accuracy of results secured by such apparatus. Another object of the invention is to provide means by which any one of several datum levels can be recorded concurrently with phenomena being recorded, to enable evaluation of the phenomena and to afford compactness in the recording secured from the apparatus.

Further objects of the invention will become apparent in reading the following detailed description in connection with the drawings in which Figs. 1 to 4 show diagrammatically the form of trace secured by the practice of the invention;

Figure 6:
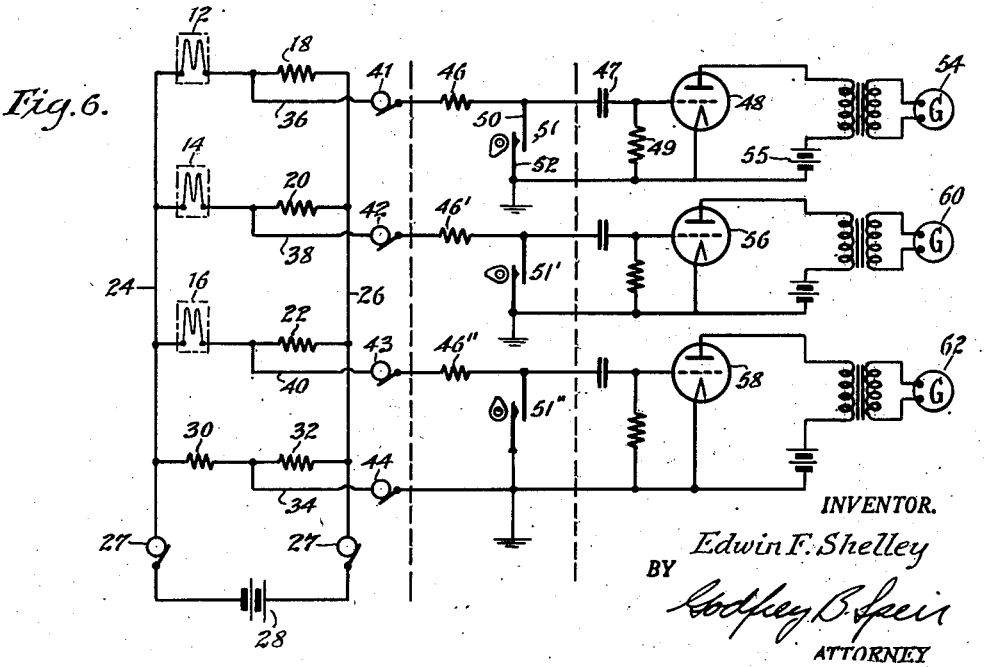
Fig. 6 is a wiring diagram incorporating features of the invention.
Figure 9:
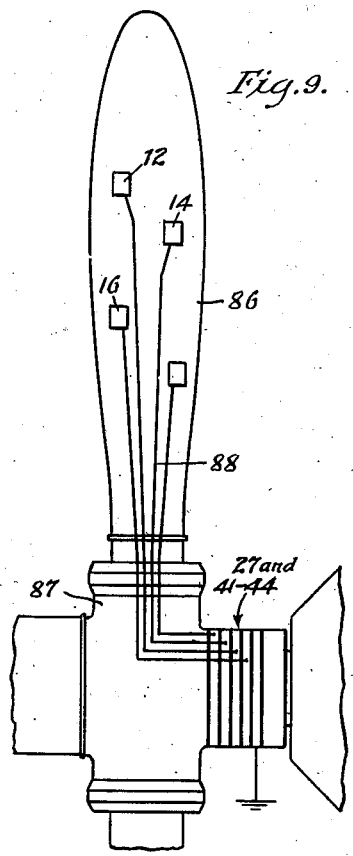
Fig. 9 is an elevation of a stressed structure incorporating the stress gages as an example of the type of structure to which the invention may be applied.

Referring first to Fig. 6, I show a plurality of stress gages 12, 14 and 16 arranged, for instance, on a propeller blade as shown in Fig. 9. Each of the gages comprises a small elastic element which is electrically conductive and which varies in resistance in accordance with the strain (or stress, if the gage is adapted for direct stress indication) imposed thereon. Upon securing the small gage to a structure subject to stress, the resistance of each gage will vary in accordance with the stress of the body.

The gages are serially connected to corresponding resistors 18, 20 and 22 having substantially the same resistance as the gages when unstrained. The sets of gages 12, 18; 14, 20; and 16, 22 are connected together at their ends by wires 24 and 26 leading, through slip rings 27 (if the article being tested is a rotating body) to a source of D. C. electric energy 28. The bridge circuit for the several sets of resistors 12, 18, etc., is completed by resistors 30 and 32 of known, and preferably but not necessarily equal value. The resistors 30 and 32 are connected in series across the wires 24 and 26. A center tap 34 between the resistors 30 and 32 provides one output connection serving all of the stress gages 12, 14 and 16.

A center tap 36 leads from a point between the resistors 12 and 18 and comprises the other output connection for the bridge represented by the elements 12, 18, 30 and 32. Similarly, center taps 38 and 40 respectively connect between the resistors 14, 20 and 16, 22 to provide output connection for the bridges represented by the elements 14, 20, 30, 32 and 16, 22, 30, 32. The output connections 36, 38, 40 and 34 are led through slip ring devices 41, 42, 43 and 44 should the bridge system be mounted on a rotating body.

The output connection 36 leads through a resistor 46 and capacitor 47 to the grid of an amplifier tube 48. The other bridge connection, common to all the bridge circuits, is grounded. The cathode of the amplifier 48 is likewise grounded and the grid of the tube is provided with a grounded grid leak 49. One contact 50 of a switch 51 is connected between the resistor 46 and the capacitor 47, the other switch point 52 of the switch 51 being grounded. The output from the anode of the amplifier 48 is transformer-coupled to an oscillograph galvanometer 54 the circuit including a suitable high voltage supply 55 whose negative terminal is grounded. Additional stages of amplification are normally used, but since they are conventional, are not shown.

Figure 5:
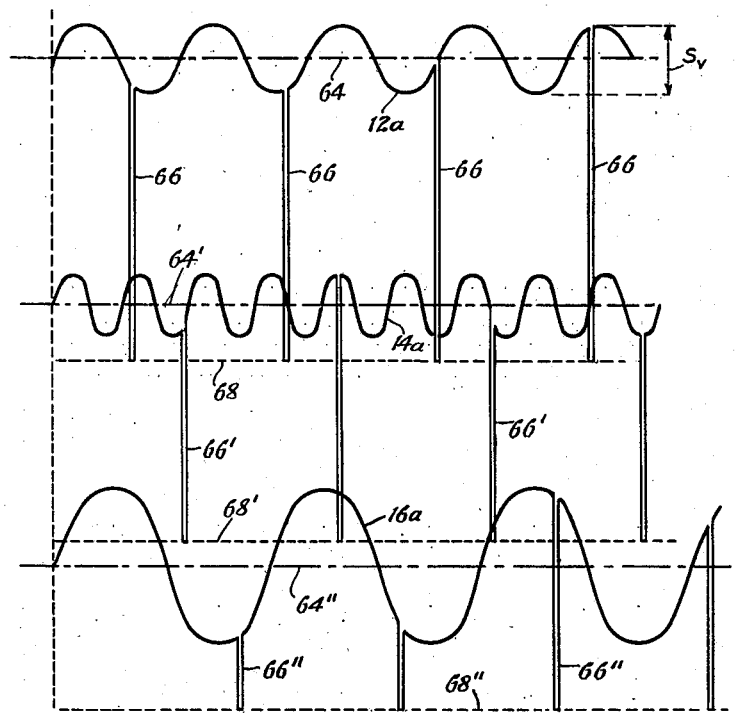
Fig. 5 shows diagrammatically the form of trace secured by the invention when a plurality of simultaneous indications are to be taken.

The other bridge circuits 14, 20 and 16, 22 are respectively provided with amplifiers 56 and 58 having identical circuit arrangements to those just described, each of said amplifiers having output galvanometers 60 and 62 respectively. The system just described provides a multi-channel stress indicating and recording system which will produce recorded traces as represented in Fig. 5 where three such traces corresponding to the action of the three stress gages 12, 14 and 16 are shown. Usually, twelve or more channels are used, similar to those described.

Figure 8:
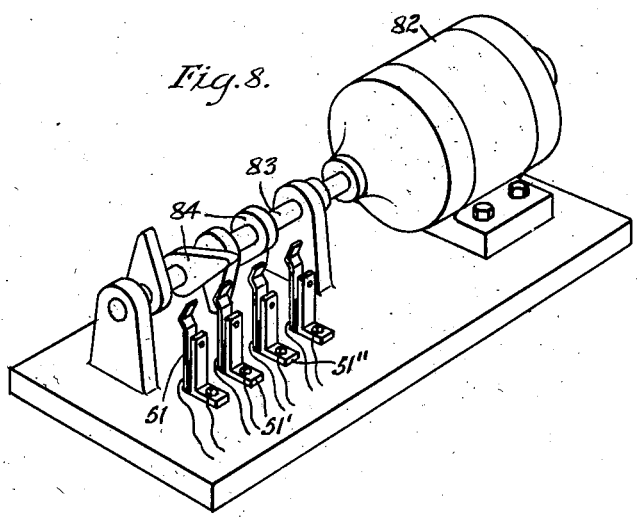
Fig. 8 is an elevation of a switch mechanism enabling practice of the invention.

The switches 51, 51' and 51" serve to short-circuit the input to the several amplifier tubes and are closed intermittently and in staggered relation by a switching device such as that shown in Fig. 8. The principle of operation of the system is the same for all channels where a multi-channel gage system is used, so that only one of the stress gage and amplifier units will be described in detail at this point. Strain variations in gage 12 will produce a recorded trace such as 12a in Fig. 5 wherein the vertical amplitude $S_v$ will be proportional to the spread of vibrative stress to which the gage is subject. The axis 64 may be drawn through the trace 12a which represents the zero axis of vibrative stress.

If the body is subject to steady stress, the axis 64 will be spaced from an axis of zero stress by an amount proportional to the steady stress in the body. In the vibration measuring equipment of the prior art there was no provision for indicating a zero stress axis since the conventional amplifier does not respond to changes in steady potential. In my arrangement, I provide for such a zero stress indication by the cyclic closing of the A. C. amplifier input by the switch 51, reducing amplifier input to zero, which inserts in the vibrative stress diagram a succession of rectangular traces 66, the ends of which remote from the curve 12a define the level of the zero or known stress level. Since the amplifier is responsive only to A. C. input, the shorting switch is timed to produce an inserted pulse at a frequency within the operating limits of the amplifier and the duration of this pulse is preferably made very short in order that it will not interfere with a true representation of the vibrative stress represented by the trace 12a. As successive pulses 66 are inserted in the vibration diagram, the ends of these pulses remote from the vibration trace may be joined by a line 68 which represents zero amplifier input, and is in effect the axis of zero or known stress. Then, the distance from the axis 68 to the axis 64 of zero vibrative stress becomes proportional to the steady stress in the body being tested. The scale for measuring steady stress, between the axes 68 and 64, may not necessarily be the same as the scale used for measuring the total change in vibrative stress $S_v$, but the scales used for each trace are determinable according to the characteristics of the bridge circuit.

Interpretation of steady-stress insertion records is facilitated by proper design of the inserted pulses. A narrow pulse is desirable to avoid obscuring the high-frequency vibratory components present in the total-stress record, but the amplifier high-frequency response places a lower limit on the width of the pulse. A pulse width of from 1 to 4 milliseconds has proved satisfactory in the measurement of propeller stresses up to 2000 c. p. s. The repetition rate of the pulse must be high enough to adequately define the low-frequency signals which the amplifier will not faithfully reproduce. A repetition rate of from 20 to 50 pulses per second is indicated for use with ordinary vibratory-stress amplifiers which begin to cut off between 5 and 10 c. p. s.

As indicated in Fig. 5, the traces 12a, 14a and 16a represent the vibrative stresses from the respective stress gages and by staggering the operation of the shorting switches 51, 51' and 51", the zero amplifier input traces 66, 66' and 66" are readily distinguished from the vibration traces so that the steady stress components for each vibration trace may be established, even though the steady stress pulses 66, 66' and 66" may overlap the vibration stress traces.

Referring to Fig. 6, the resistors 46, 46' and 46" in the bridge output circuits of the several stress gages are inserted for the purpose of avoiding crosstalk or interference during the sequential operation of the several shorting switches. The values of these resistors will be considerably greater than the values of resistance in the stress gages and the bridge components so that the operation of the shorting switches will not affect materially the true indication of the stress gage circuits which are not short circuited.

Figure 1:
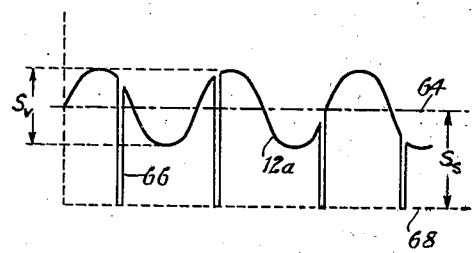
Figure 2:
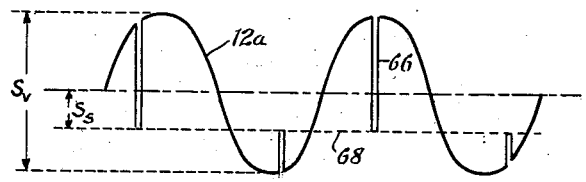
Figure 3:
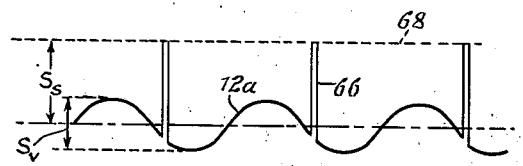
Figure 4:
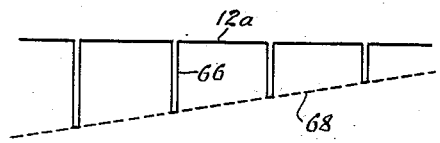

Figs. 1 to 4 show different sorts of traces for single stress gage circuits and amplifiers. In Fig. 1, the vibrative stress amplitude $S_v$ is somewhat less than the steady stress amplitude $S_s$ between the axes 64 and 68. Both the steady stress and the vibrative stress will produce tension, for instance, in the element, under all conditions of operation. In Fig. 2, the traces are shown to represent a condition where the steady stress amplitude $S_s$ is considerably less than the vibratory stress amplitude $S_v$, resulting in a situation where the major stress in the body is tension but where the body is also subject to vibrative compressive stresses below the axis 68. In Fig. 3, a condition is shown which is the inverse of Fig. 1, wherein the body is in compression at all times. Fig. 4 shows a condition of transient slowly varying stress, the trace 12a being representive of the change in stress level and the axis 68 representing the axis of zero amplifier input. The pulses 66 establish the axis 68 and enable the investigator to establish the amount and rate of change of the slowly varying stress in the body.

Figure 7:
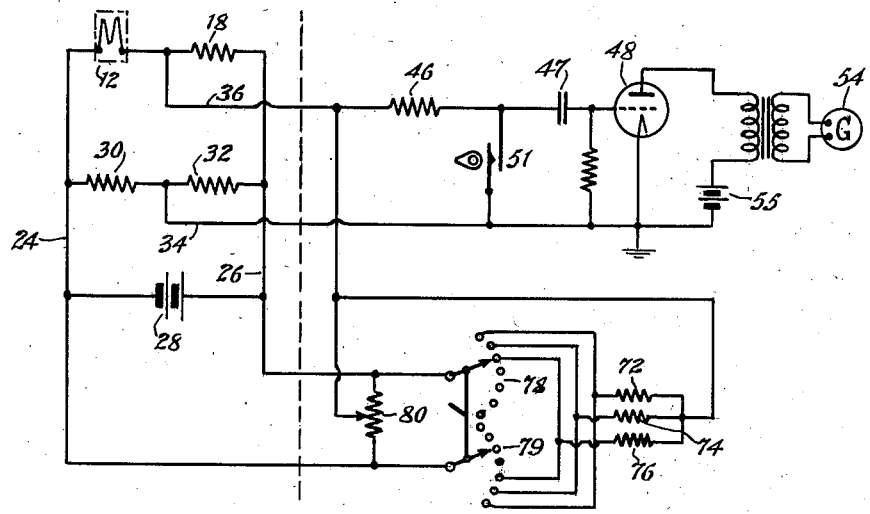
Fig. 7 is a wiring diagram of an alternative embodiment of the invention.

Reference may now be made to Fig. 7 which shows substantially one of the bridge circuits previously shown in Fig. 6, the common components bearing the same reference characters. In addition, a set of precision resistors 72, 74 and 76, each having a different value, have their one ends connected together and to the bridge output connection 36. The other ends of the several resistors are connected to points of a pair of selector switches 78 and 79 whose arms, mechanically joined together for joint movement, are connected to the bridge conductors 24 and 26. In the position of the switches 78 and 79 shown in Fig. 7, the conductor 26 connects through the switch 78 to the resistor 76, which has the effect of shunting the resistor 76 across the resistor 18. Other positions of the switches will permit of the shunting of resistors 72, 74 or 76, selectively, across the bridge resistor 18 or across the stress gage 12. The effect of shunting these resistors across the bridge elements is to insert a predetermined steady stress level in the bridge system which will have the effect of changing the stress level represented by the axis 68 in Figs. 1 through 5. The height of the trace 12a will be altered with respect to the axis 68 by the insertion of the various shunt resistors, thus permitting a shortening of the rectangular pulses 66 by a known amount. In effect, specific stress values may be inserted in the oscillograph traces. For example, —30,000 to +30,000 pounds per square inch apparent stress can be inserted in the diagrams by the appropriate insertion of the shunt resistors 72, 74 and 76. When dealing with high stresses, this flexibility in establishing the datum stress level is highly desirable to avoid unduly elongated traces 66 on the record of the oscillograph.

A potentiometer 80 is placed across the conductors 24 and 26, with its arm leading to the conductor 36, for the purpose of balancing the bridge initially, whereby zero stress in the article will produce zero potential at the bridge output terminals.

As mentioned heretofore, Fig. 8 shows a switching mechanism appropriate for operating the several shorting switches 51. The mechanism comprises an electric motor 82 driving a camshaft 83 equipped with a plurality of cams 83. The cam lobes are spaced apart circumferentially and engage with the several shorting switches 51 during rotation of the camshaft. The speed of the motor and the shape of the cam lobes may be so chosen as to produce any desired frequency of switch closure and any desired duration for switch closure. Other intermittent switching devices will readily occur to those skilled in the art and, while a mechanism similar to Fig. 8 has been successfully used, it is merely exemplary.

Fig. 9 shows a typical arrangement of stress gages on an aeronautical propeller blade, wherein 86 represents the blade which is mounted for pitch change in a propeller hub 87. The various conductors 88 from the stress gages are led to collector ring assemblies which are connected in turn to the amplifier systems already described.

The field of usefulness of the steady stress insertion method herein described is extensive. Steady stress insertion equipment has been used for aircraft propellers, aircraft structures, propeller control systems, recording propeller blade angles and blade twisting moments and torque and a wide variety of phenomena encountered in experimental research. It is evident that the use of properly designed steady stress pulse insertion is applicable to the measurement of slowly varying phenomena as well as vibration phenomena since in effect, the insertion technique extends the response range of the conventional A. C. responsive amplifier to zero frequency of the phenomena with no sacrifice in stability.

While several arrangements exemplary of the invention have been shown in connection with application to propeller vibration measurement techniques, it is to be understood that the invention may be applied in various forms to a wide range of articles whose characteristics are to be measured. Various changes may be made in the arrangement of the apparatus without departing from the spirit of the invention as will be apparent to those skilled in the art. Reference should be made to the appended claims for a definition of the limits of the invention.

What is claimed is:

1. In stress measurement wherein an electrical resistor gage changes its resistance in response to strain of a body to which the gage is secured, a circuit including said gage, means continuously operable to plot changes in gage resistance and hence, body strain, against time, and means intermittently operable for brief intervals and at a frequency differing from the variations in body strain to alter the gage circuit to a finite resistance value to impose upon said plot a plurality of datum points from which the plotted strain points may be evaluated as to strain magnitude.

2. In a measuring system, in combination, a circuit including an electrical gage, the circuit yielding an output signal proportional in magnitude to a quantity to be measured, an amplifier system responsive in its output to the gage circuit output signal, means to record said amplifier output, and means to impose a signal of known magnitude on the amplifier input in place of the gage circuit signal, at brief intervals and at a fixed frequency differing from the frequency of the variations of the quantity to be measured, to pass, through said amplifier to said recording means, a signal which provides a datum from which the amplitude of the recorded amplified gage circuit signal may be evaluated.

3. In a measuring system, in combination, a circuit including an electrical gage, the circuit yielding an output signal proportional in amplitude to a quantity to be measured, means to record said gage circuit signal, and means operable at brief intervals and at a fixed frequency differing from the frequency of the quantity to be measured to interrupt said gage circuit signal and to replace it with a signal of known magnitude to provide a recorded known datum from which the magnitude of said gage circuit signals may be evaluated.

4. In a system for measuring steady and vibratory stress in a body, a stress gage secured to said body, the electrical resistance of said gage being variable substantially in proportion to the stress in said body, an exciter and bridge circuit associated with said gage having output conductors carrying a potential proportional to gage resistance, an amplifying circuit and recording means recording a trace, against time, showing the fluctuations of said potential with vibratory stress in said body, and means to indicate with said trace an intermittent repetitive short duration trace showing known stress from which the magnitude of steady and vibratory stress may be evaluated the repetition of said intermittent trace being at a frequency differing from the frequency of the vibratory stress.

5. In a system for measuring steady and vibratory stress in a body, a stress gage secured to said body, the electrical resistance of said gage being variable substantially in proportion to the stress in said body, an exciter and bridge circuit associated with said gage having output conductors carrying a potential proportional to gage resistance, an amplifying circuit and recording means recording a trace, against time, showing the fluctuations of said potential with vibratory stress in said body, and means to indicate with said trace an intermittent short duration trace at a frequency differing from that of the vibratory stress showing known stress from which the magnitude of steady and vibratory stress may be evaluated, said means comprising a switch intermittently operated to short circuit said output conductors.

6. In a system for measuring steady and vibratory stress in a body, a stress gage secured to said body, the electrical resistance of said gage being variable substantially in proportion to the stress in said body, an exciter and bridge circuit associated with said gage having output conductors carrying a potential proportional to gage resistance, an amplifying circuit and recording means recording a trace, against time, showing the fluctuations of said potential with vibratory stress in said body, and means to indicate with said trace a trace showing known stress from which the magnitude of steady and vibratory stress may be evaluated, said means comprising a switch intermittently operated to short circuit said output conductors, one of said output conductors, between said switch and gage, having a series resistance of substantially greater value than the resistance of said gage.

7. In a system for measuring variable stress in a body, a plurality of resistance strain gages mounted thereon, bridge circuits for each said gage, common exciting means for said bridge circuits, each said bridge circuit having output leads one at least carrying a series resistor of resistance substantially greater than the normal resistance of said gages, an amplifier for the output of each said bridge circuit, unitary intermittently operable means for all of said bridge circuits to alter the effects of each bridge circuit output on its amplifiers, disposed between said resistors and amplifiers, and a single recording system fed by and responsive to the signals from said amplifiers.

8. In a system for measuring variable stress in a body, a plurality of resistance strain gages mounted thereon, bridge circuits for each said gage, common exciting means for said bridge circuits, each said bridge circuit having output leads one at least carrying a series resistor of resistance substantially greater than the normal resistance of said gages, an amplifier for the output of each said bridge circuit, a recording system fed by and responsive to the signals from said amplifiers, and unitary means serving all bridge circuits intermittently operable to short circuit the output leads of each bridge.

9. In a system for measuring variable stress in a body, a plurality of resistance strain gages mounted thereon, bridge circuits for each said gage, common exciting means for said bridge circuits, each said bridge circuit having output leads one at least carrying a series resistor of resistance substantially greater than the normal resistance of said gages, an amplifier for the output of each said bridge circuit, a recording system fed by and responsive to the signals from said amplifiers, and means intermittently operable to short circuit the output leads of each bridge, said short circuiting means having a common driving member operable to short circuit the several sets of output leads in sequence.

10. In a system for measuring variable stress in a body, a plurality of resistance strain gages mounted thereon, bridge circuits for each said gage, common exciting means for said bridge circuits, each said bridge circuit having output leads one at least carrying a series resistor of resistance substantially greater than the normal resistance of said gages, an amplifier for the output of each said bridge circuit, a recording system fed by and responsive to the signals from said amplifiers, means having a common driver intermittently operable to short circuit the output leads of each bridge, and a shunt resistor around one of the resistances of the bridge circuit operable to vary the signal level of said bridge output.

11. In a system for measuring variable and steady stress in a body, a resistance strain gage mounted thereon, a bridge circuit and exciter, the gage forming part of said bridge circuit, an A. C. responsive amplifier whose input signals are primarily the variable output signals of said bridge, a recording means producing a trace responsive to amplifier output, and means intermittently and briefly operable as compared with the duration of the trace to reduce amplifier input to a known fixed value, at a frequency within the response range of said amplifier.

12. In a system for measuring variable and steady stress in a body, a resistance strain gage mounted thereon, a bridge circuit and exciter, the gage forming part of said bridge circuit, an A. C. responsive amplifier whose input signals are primarily the variable output signals of said bridge, a recording means producing a trace responsive to amplifier output, means intermittently and briefly operable as compared with the duration of the trace to reduce amplifier input to a known fixed value, at a frequency within the response range of said amplifier, and means operable to change the characteristics of said bridge output to adjust the relative position of the trace due to amplified bridge output and the trace due to intermittent reduction of amplifier input.

EDWIN F. SHELLEY.

REFERENCES CITED

The following references are of record in the file of this patent:

UNITED STATES PATENTS

| Number | Name | Date |
|---|---|---|
| 2,210,903 | Dunmore | Aug. 13, 1940 |
| 2,252,464 | Kearns et al. | Aug. 12, 1941 |
| 2,295,570 | Dunmore | Sept. 15, 1942 |
| 2,393,669 | Wheaton et al. | Jan. 29, 1946 |
| 2,422,806 | Silverman et al. | June 24, 1947 |
| 2,423,867 | Zenor et al. | July 15, 1947 |
| 2,416,276 | Ruge | Feb. 18, 1947 |

FOREIGN PATENTS

| Number | Country | Date |
|---|---|---|
| 571,003 | Great Britain | Aug. 1, 1945 |

OTHER REFERENCES

Technical Publication entitled "Stress Measurement by Electrical Means," by Robert E. Kern and Sidney B. Williams. AIEE Technical Paper 46-60, December, 1945. American Institute of Electrical Engineers, 33 W. 39th Street, New York, New York. Copy in 73-88.5.